(12) United States Patent
Kadous et al.

(10) Patent No.: US 12,407,394 B2
(45) Date of Patent: Sep. 2, 2025

(54) WIRELESS COMMUNICATION WITH QUASI-OMNI AND DIRECTIONAL BEAMS

(71) Applicant: Virewirx, Inc., San Diego, CA (US)

(72) Inventors: Tamer Adel Kadous, San Diego, CA (US); Siddhartha Mallik, San Diego, CA (US)

(73) Assignee: Virewirx, Inc., San Diego, CA (US)

(*) Notice: Subject to any disclaimer, the term of this patent is extended or adjusted under 35 U.S.C. 154(b) by 534 days.

(21) Appl. No.: 17/644,162

(22) Filed: Dec. 14, 2021

(65) Prior Publication Data

US 2022/0191852 A1 Jun. 16, 2022

Related U.S. Application Data

(60) Provisional application No. 63/126,427, filed on Dec. 16, 2020.

(51) Int. Cl.
*H04W 72/044* (2023.01)
*H04B 7/06* (2006.01)
*H04W 74/0808* (2024.01)

(52) U.S. Cl.
CPC ........ *H04W 72/046* (2013.01); *H04B 7/0617* (2013.01); *H04B 7/0689* (2013.01); *H04B 7/0695* (2013.01); *H04B 7/06952* (2023.05); *H04B 7/06966* (2023.05); *H04W 74/0808* (2013.01)

(58) Field of Classification Search
CPC ........... H04W 72/046; H04W 72/0453; H04W 74/0808; H04W 84/12; H04B 7/0617; H04B 7/0689; H04B 7/088; H04B 7/0695; H04B 7/06966
See application file for complete search history.

(56) References Cited

U.S. PATENT DOCUMENTS

| | | | |
|---|---|---|---|
| 6,636,568 B2 | 10/2003 | Kadous | |
| 6,801,580 B2 | 10/2004 | Kadous | |
| 6,873,606 B2 | 3/2005 | Agrawal | |
| 6,917,821 B2 | 7/2005 | Kadous | |
| 6,928,062 B2 | 8/2005 | Krishnan | |
| 7,012,883 B2 | 3/2006 | Jalali | |
| 7,020,073 B2 | 3/2006 | Kadous | |
| 7,039,001 B2 | 5/2006 | Krishnan | |

(Continued)

FOREIGN PATENT DOCUMENTS

| | | |
|---|---|---|
| CN | 103067065 | 4/2013 |
| KR | 10-2016-0101007 A | 8/2016 |

OTHER PUBLICATIONS

Akhtar, et al., "Efficient Network Level Beamforming Training for IEEE 802.11ad WLANs," 2015.

(Continued)

*Primary Examiner* — Omer S Mian
(74) *Attorney, Agent, or Firm* — Knobbe, Martens, Olson & Bear, LLP

(57) ABSTRACT

Aspects of this disclosure relate to wireless communications that involve a quasi-omni beam and a directional beam, where the wireless communications involve radio frequency signals having relatively high frequency (e.g., a frequency above 20 GHz). In embodiments, a quasi-omni beam is wirelessly transmitted, a directional beam is selected based on the quasi-omni beam, and a data transmission is received over the selected directional beam.

18 Claims, 9 Drawing Sheets

(56) References Cited

U.S. PATENT DOCUMENTS

| | | |
|---|---|---|
| 7,042,857 B2 | 5/2006 | Krishnan |
| 7,095,790 B2 | 8/2006 | Krishnan |
| 7,145,940 B2 | 12/2006 | Gore |
| 7,167,684 B2 | 1/2007 | Kadous |
| 7,177,351 B2 | 2/2007 | Kadous |
| 7,184,713 B2 | 2/2007 | Kadous |
| 7,194,041 B2 | 3/2007 | Kadous |
| 7,236,535 B2 | 6/2007 | Subramaniam |
| 7,418,046 B2 | 8/2008 | Gore |
| 7,428,269 B2 | 9/2008 | Sampath |
| 7,457,639 B2 | 11/2008 | Subramaniam |
| 7,463,576 B2 | 12/2008 | Krishnan |
| 7,477,693 B2 | 1/2009 | Subramaniam |
| 7,508,748 B2 | 3/2009 | Kadous |
| 7,567,621 B2 | 7/2009 | Sampath |
| 7,606,326 B2 | 10/2009 | Krishnan |
| 7,668,125 B2 | 2/2010 | Kadous |
| 7,675,886 B2 | 3/2010 | Agrawal |
| 7,725,799 B2 | 5/2010 | Walker |
| 7,890,144 B2 | 2/2011 | Subramaniam |
| 7,903,615 B2 | 3/2011 | Gorokhov |
| 7,940,663 B2 | 5/2011 | Kadous |
| 7,948,959 B2 | 5/2011 | Wang |
| 7,974,359 B2 | 7/2011 | Gorokhov |
| 8,014,331 B2 | 9/2011 | Sarkar |
| 8,073,068 B2 | 12/2011 | Kim |
| 8,077,654 B2 | 12/2011 | Sutivong |
| 8,077,691 B2 | 12/2011 | Kadous |
| 8,098,635 B2 | 1/2012 | Montojo |
| 8,107,517 B2 | 1/2012 | Naguib |
| 8,139,672 B2 | 3/2012 | Gore |
| 8,204,530 B2 | 6/2012 | Gorokhov |
| 8,229,423 B2 | 7/2012 | Sarkar |
| 8,306,096 B2 | 11/2012 | Sampath |
| 8,331,310 B2 | 12/2012 | Wang |
| 8,331,892 B2 | 12/2012 | Kadous |
| 8,340,605 B2 | 12/2012 | Hou |
| 8,351,456 B2 | 1/2013 | Kadous |
| 8,379,705 B2 | 2/2013 | Mallik |
| 8,385,433 B2 | 2/2013 | Wang |
| 8,385,465 B2 | 2/2013 | Kadous |
| 8,391,196 B2 | 3/2013 | Gorokhov |
| 8,391,413 B2 | 3/2013 | Mantravadi |
| 8,432,821 B2 | 4/2013 | Gorokhov |
| 8,451,740 B2 | 5/2013 | Sampath |
| 8,451,776 B2 | 5/2013 | Dayal |
| 8,457,152 B2 | 6/2013 | Gorokhov |
| 8,457,221 B2 | 6/2013 | Palanki |
| 8,462,859 B2 | 6/2013 | Sampath |
| 8,493,958 B2 | 7/2013 | Attar |
| 8,498,192 B2 | 7/2013 | Bhushan |
| 8,498,647 B2 | 7/2013 | Gorokhov |
| 8,526,347 B2 | 9/2013 | Wang |
| 8,548,385 B2 | 10/2013 | Sofer et al. |
| 8,576,742 B2 | 11/2013 | Yoo |
| 8,576,760 B2 | 11/2013 | Gorokhov |
| 8,588,801 B2 | 11/2013 | Gorokhov |
| 8,605,729 B2 | 12/2013 | Dayal |
| 8,614,981 B2 | 12/2013 | Mallik |
| 8,619,717 B2 | 12/2013 | Agrawal |
| 8,634,435 B2 | 1/2014 | Kadous |
| 8,639,190 B2 | 1/2014 | Gore |
| 8,654,705 B2 | 2/2014 | Wang |
| 8,654,715 B2 | 2/2014 | Wang |
| 8,655,400 B2 | 2/2014 | Kadous |
| 8,675,511 B2 | 3/2014 | Gorokhov |
| 8,675,560 B2 | 3/2014 | Yoo |
| 8,676,209 B2 | 3/2014 | Gorokhov |
| 8,724,545 B2 | 5/2014 | Dayal |
| 8,724,555 B2 | 5/2014 | Krishnan |
| 8,737,470 B2 | 5/2014 | Walker |
| 8,760,994 B2 | 6/2014 | Wang |
| 8,767,885 B2 | 7/2014 | Sampath |
| 8,780,869 B2 | 7/2014 | Bracha |
| 8,781,005 B2 | 7/2014 | Mallik |
| 8,787,183 B2 | 7/2014 | Mallik |
| 8,812,657 B2 | 8/2014 | Mallik |
| 8,817,924 B2 | 8/2014 | Mallik |
| 8,825,860 B2 | 9/2014 | Linsky |
| 8,830,934 B2 | 9/2014 | Banister |
| 8,842,693 B2 | 9/2014 | Agrawal |
| 8,848,607 B2 | 9/2014 | Wang |
| 8,855,000 B2 | 10/2014 | Mallik |
| 8,855,001 B2 | 10/2014 | Gorokhov |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,220 B2 | 11/2014 | Kadous |
| 8,903,021 B2 | 12/2014 | Mantravadi |
| 8,908,496 B2 | 12/2014 | Kadous |
| 8,923,109 B2 | 12/2014 | Wang |
| 8,923,208 B2 | 12/2014 | Dayal |
| 8,954,063 B2 | 2/2015 | Sarkar |
| 8,971,461 B2 | 3/2015 | Sampath |
| 8,971,823 B2 | 3/2015 | Gore |
| 8,976,662 B2 | 3/2015 | Somasundaram |
| 9,036,538 B2 | 5/2015 | Palanki |
| 9,071,315 B2 | 6/2015 | Huang |
| 9,088,389 B2 | 7/2015 | Gorokhov |
| 9,106,287 B2 | 8/2015 | Wang |
| 9,107,056 B2 | 8/2015 | Damnjanovic |
| 9,113,488 B2 | 8/2015 | Oguz |
| 9,136,953 B2 | 9/2015 | Yoo |
| 9,136,974 B2 | 9/2015 | Gorokhov |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,210,605 B2 | 12/2015 | Yoo |
| 9,226,173 B2 | 12/2015 | Sadek |
| 9,237,434 B2 | 1/2016 | Mallik |
| 9,246,560 B2 | 1/2016 | Sampath |
| 9,253,658 B2 | 2/2016 | Sadek |
| 9,264,183 B2 | 2/2016 | Gorokhov |
| 9,265,047 B2 | 2/2016 | Mallik |
| 9,270,441 B2 | 2/2016 | Mallik |
| 9,277,564 B2 | 3/2016 | Wang |
| 9,282,462 B2 | 3/2016 | Dayal |
| 9,307,544 B2 | 4/2016 | Gore |
| 9,351,307 B2 | 5/2016 | Luo |
| 9,398,602 B2 | 7/2016 | Kadous |
| 9,408,220 B2 | 8/2016 | Gore |
| 9,451,480 B2 | 9/2016 | Huang |
| 9,461,736 B2 | 10/2016 | Bhushan |
| 9,474,051 B2 | 10/2016 | John Wilson |
| 9,474,075 B2 | 10/2016 | Yavuz |
| 9,485,069 B2 | 11/2016 | Wang |
| 9,497,765 B2 | 11/2016 | Yoo |
| 9,521,554 B2 | 12/2016 | Farajidana |
| 9,578,649 B2 | 2/2017 | Dayal |
| 9,585,156 B2 | 2/2017 | Bhattad |
| 9,660,776 B2 | 5/2017 | Kadous |
| 9,693,323 B2 | 6/2017 | Mallik |
| 9,750,014 B2 | 8/2017 | Sadek |
| 9,755,705 B2 | 9/2017 | Hou |
| 9,780,847 B2 | 10/2017 | Budianu |
| 9,788,361 B2 | 10/2017 | Valliappan |
| 9,813,497 B2 | 11/2017 | Mallik |
| 9,832,785 B2 | 11/2017 | Kadous |
| 9,860,033 B2 | 1/2018 | Kadous |

(56) References Cited

U.S. PATENT DOCUMENTS

| | | | |
|---|---|---|---|
| 9,867,194 | B2 | 1/2018 | Kadous |
| 9,877,203 | B2 | 1/2018 | Yoo |
| 9,882,623 | B2 | 1/2018 | Sun |
| 9,900,074 | B2 | 2/2018 | Mallik |
| 9,924,368 | B2 | 3/2018 | Valliappan |
| 9,929,835 | B2 | 3/2018 | Dabeer |
| 9,936,400 | B2 | 4/2018 | Lee |
| 9,942,801 | B2 | 4/2018 | Yerramalli |
| 9,954,668 | B2 | 4/2018 | Lee |
| 9,961,579 | B2 | 5/2018 | Geirhofer |
| 9,967,729 | B2 | 5/2018 | Wang |
| 9,973,923 | B2 | 5/2018 | Damnjanovic |
| 9,991,989 | B2 | 6/2018 | Malladi |
| 9,992,004 | B2 | 6/2018 | Mallik |
| 10,009,053 | B2 | 6/2018 | Somasundaram |
| 10,020,911 | B2 | 7/2018 | Mallik |
| 10,021,677 | B2 | 7/2018 | Mallik |
| 10,028,332 | B2 | 7/2018 | Mallik |
| 10,033,558 | B2 | 7/2018 | Yoo |
| 10,034,269 | B2 | 7/2018 | Sun |
| 10,044,438 | B2 | 8/2018 | Kadous |
| 10,044,459 | B2 | 8/2018 | Chendamarai Kannan |
| 10,085,283 | B2 | 9/2018 | Yoo |
| 10,091,789 | B2 | 10/2018 | Valliappan |
| 10,098,140 | B2 | 10/2018 | Mallik |
| 10,123,323 | B2 | 11/2018 | Mallik |
| 10,136,333 | B2 | 11/2018 | Yoo |
| 10,136,452 | B2 | 11/2018 | Liu |
| 10,143,005 | B2 | 11/2018 | Chendamarai Kannan |
| 10,149,293 | B2 | 12/2018 | Damnjanovic |
| 10,149,318 | B2 | 12/2018 | Sun |
| 10,178,649 | B2 | 1/2019 | Liu |
| 10,182,404 | B2 | 1/2019 | Prakash |
| 10,187,900 | B2 | 1/2019 | Zhang |
| 10,200,904 | B2 | 2/2019 | Zhang |
| 10,201,014 | B2 | 2/2019 | Kadous |
| 10,206,117 | B2 | 2/2019 | Damnjanovic |
| 10,218,406 | B2 | 2/2019 | Liu |
| 10,219,235 | B2 | 2/2019 | Patel |
| 10,219,252 | B2 | 2/2019 | Chendamarai Kannan |
| 10,219,292 | B2 | 2/2019 | Damnjanovic |
| 10,219,300 | B2 | 2/2019 | Gorokhov |
| 10,225,818 | B2 | 3/2019 | Liu |
| 10,231,131 | B2 | 3/2019 | Zhang |
| 10,231,132 | B2 | 3/2019 | Zhang |
| 10,244,399 | B2 | 3/2019 | Damnjanovic |
| 10,250,678 | B2 | 4/2019 | Mallik |
| 10,257,848 | B2 | 4/2019 | Sun |
| 10,257,851 | B2 | 4/2019 | Patel |
| 10,264,541 | B2 | 4/2019 | Patel |
| 10,270,579 | B2 | 4/2019 | Chendamarai Kannan |
| 10,278,177 | B2 | 4/2019 | Sadek |
| 10,285,117 | B2 | 5/2019 | Yoo |
| 10,291,379 | B2 | 5/2019 | Kadous |
| 10,292,093 | B2 | 5/2019 | Chendamarai Kannan |
| 10,298,289 | B2 | 5/2019 | Yerramalli |
| 10,299,284 | B2 | 5/2019 | Sadek |
| 10,312,987 | B2 | 6/2019 | Mallik |
| 10,327,241 | B2 | 6/2019 | Kadous |
| 10,327,261 | B2 | 6/2019 | Naghshvar |
| 10,333,595 | B2 | 6/2019 | Fakoorian |
| 10,333,668 | B2 | 6/2019 | Yoo |
| 10,334,546 | B2 | 6/2019 | Chendamarai Kannan |
| 10,341,884 | B2 | 7/2019 | Sun |
| 10,349,404 | B2 | 7/2019 | Chendamarai Kannan |
| 10,356,626 | B2 | 7/2019 | Montojo |
| 10,356,816 | B2 | 7/2019 | Valliappan |
| 10,362,574 | B2 | 7/2019 | Chendamarai Kannan |
| 10,368,301 | B2 | 7/2019 | Chendamarai Kannan |
| 10,368,305 | B2 | 7/2019 | Radulescu |
| 10,368,348 | B2 | 7/2019 | Chendamarai Kannan |
| 10,368,372 | B2 | 7/2019 | Chendamarai Kannan |
| 10,374,777 | B2 | 8/2019 | Kadous |
| 10,375,711 | B2 | 8/2019 | Sadek |
| 10,389,479 | B2 | 8/2019 | Yoo |
| 10,397,754 | B2 | 8/2019 | Vajapeyam |
| 10,397,796 | B2 | 8/2019 | Sun |
| 10,404,434 | B2 | 9/2019 | Kannan |
| 10,404,509 | B2 | 9/2019 | Sun |
| 10,405,228 | B2 | 9/2019 | Liu |
| 10,405,242 | B2 | 9/2019 | Kadous |
| 10,405,262 | B2 | 9/2019 | Chendamarai Kannan |
| 10,405,335 | B2 | 9/2019 | Barghi |
| 10,411,795 | B2 | 9/2019 | Liu |
| 10,412,704 | B2 | 9/2019 | Sun |
| 10,425,826 | B2 | 9/2019 | Fakoorian |
| 10,425,945 | B2 | 9/2019 | Sun |
| 10,432,272 | B1 | 10/2019 | Black et al. |
| 10,433,179 | B2 | 10/2019 | Zhang |
| 10,448,296 | B2 | 10/2019 | Radulescu |
| 10,455,455 | B2 | 10/2019 | Yoo |
| 10,455,457 | B2 | 10/2019 | Sadek |
| 10,461,797 | B2 | 10/2019 | Liu |
| 10,462,676 | B2 | 10/2019 | Mallik |
| 10,470,048 | B2 | 11/2019 | Zhang |
| 10,470,112 | B2 | 11/2019 | Damnjanovic |
| 10,476,781 | B2 | 11/2019 | Luo |
| 10,477,437 | B2 | 11/2019 | Zhang |
| 10,477,526 | B2 | 11/2019 | Chendamarai Kannan |
| 10,484,135 | B2 | 11/2019 | Mallik |
| 10,484,212 | B2 | 11/2019 | Yoo |
| 10,484,878 | B2 | 11/2019 | Patel |
| 10,484,934 | B2 | 11/2019 | Malik |
| 10,484,935 | B2 | 11/2019 | Li |
| 10,484,954 | B2 | 11/2019 | Liu |
| 10,484,959 | B2 | 11/2019 | Liu |
| 10,484,992 | B2 | 11/2019 | Sadek |
| 10,485,027 | B2 | 11/2019 | Mallik |
| 10,490,895 | B2 | 11/2019 | Abdallah et al. |
| 10,492,220 | B2 | 11/2019 | Sun |
| 10,499,394 | B2 | 12/2019 | Damnjanovic |
| 10,506,629 | B2 | 12/2019 | Sun et al. |
| 10,511,399 | B2 | 12/2019 | Sun et al. |
| 10,511,987 | B2 | 12/2019 | Liu et al. |
| 10,516,618 | B2 | 12/2019 | Barghi et al. |
| 10,523,300 | B2 | 12/2019 | Malik et al. |
| 10,524,279 | B2 | 12/2019 | Yoo |
| 10,536,195 | B2 | 1/2020 | Sun |
| 10,536,944 | B2 | 1/2020 | Zhang |
| 10,536,966 | B2 | 1/2020 | Liu et al. |
| 10,541,851 | B2 | 1/2020 | Malik et al. |
| 10,542,436 | B2 | 1/2020 | Liu et al. |
| 10,542,541 | B2 | 1/2020 | Valliappan et al. |
| 10,542,543 | B2 | 1/2020 | Yerramalli et al. |
| 10,542,556 | B2 | 1/2020 | Mallik |
| 10,547,422 | B2 | 1/2020 | Yoo et al. |
| 10,547,494 | B2 | 1/2020 | Liu et al. |
| 10,548,020 | B2 | 1/2020 | Khoshnevisan et al. |
| 10,548,131 | B2 | 1/2020 | Yerramalli et al. |
| 10,548,153 | B2 | 1/2020 | Akkarakaran et al. |
| 10,554,539 | B2 | 2/2020 | Luo |
| 10,554,540 | B2 | 2/2020 | Luo |
| 10,555,203 | B2 | 2/2020 | Malik |
| 10,555,220 | B2 | 2/2020 | Yerramalli |
| 10,560,304 | B2 | 2/2020 | Lei |
| 10,574,422 | B2 | 2/2020 | Wang |
| 10,574,565 | B2 | 2/2020 | Luo |
| 10,575,185 | B2 | 2/2020 | Li |
| 10,581,568 | B2 | 3/2020 | Mallik |
| 10,581,572 | B2 | 3/2020 | Chendamarai Kannan |
| 10,581,722 | B2 | 3/2020 | Luo |
| 10,587,497 | B2 | 3/2020 | Luo |
| 10,595,327 | B2 | 3/2020 | Sadek |
| 10,595,342 | B2 | 3/2020 | Islam |
| 10,602,543 | B2 | 3/2020 | Sun |
| 10,602,545 | B2 | 3/2020 | Mallik |
| 10,609,660 | B2 | 3/2020 | Liu |
| 10,609,664 | B2 | 3/2020 | Zhang |
| 10,616,737 | B2 | 4/2020 | Liu |
| 10,616,771 | B2 | 4/2020 | Montojo |
| 10,616,912 | B2 | 4/2020 | Chendamarai Kannan |
| 10,623,163 | B2 | 4/2020 | Sun |
| 10,686,502 | B1 | 6/2020 | Zhao et al. |
| 10,742,299 | B2 | 8/2020 | Abouelseoud |

(56) References Cited

U.S. PATENT DOCUMENTS

| | | |
|---|---|---|
| 10,756,767 B1 | 8/2020 | Jabobs et al. |
| 10,756,782 B1 | 8/2020 | Kadous et al. |
| 10,756,795 B2 | 8/2020 | Black et al. |
| 11,032,841 B2 | 6/2021 | Kadous et al. |
| 11,218,192 B2 | 1/2022 | Kadous et al. |
| 2004/0121730 A1 | 6/2004 | Kadous |
| 2006/0203794 A1 | 9/2006 | Sampath |
| 2007/0041457 A1 | 2/2007 | Kadous |
| 2007/0071147 A1 | 3/2007 | Sampath |
| 2007/0165738 A1 | 7/2007 | Barriac |
| 2008/0025241 A1 | 1/2008 | Bhushan |
| 2008/0112495 A1 | 5/2008 | Gore |
| 2009/0122715 A1 | 5/2009 | Lakkis |
| 2010/0003931 A1 | 1/2010 | Krishnan |
| 2010/0056062 A1 | 3/2010 | Zhang et al. |
| 2010/0067422 A1 | 3/2010 | Kadous |
| 2011/0007680 A1 | 1/2011 | Kadous |
| 2011/0007688 A1 | 1/2011 | Veeravalli |
| 2011/0237192 A1 | 9/2011 | Maltsev et al. |
| 2011/0256834 A1 | 10/2011 | Dayal |
| 2012/0026940 A1 | 2/2012 | Barbieri |
| 2012/0077532 A1 | 3/2012 | Kadous |
| 2012/0113906 A1 | 5/2012 | Kadous |
| 2012/0127923 A1 | 5/2012 | Zhao |
| 2012/0140798 A1 | 6/2012 | Kadous |
| 2012/0201158 A1 | 8/2012 | Geirhofer |
| 2012/0213303 A1 | 8/2012 | Kadous |
| 2012/0314655 A1 | 12/2012 | Xue |
| 2013/0058276 A1 | 3/2013 | Somasundaram |
| 2013/0194948 A1 | 8/2013 | Mallik |
| 2013/0229935 A1 | 9/2013 | Gorokhov |
| 2013/0231058 A1* | 9/2013 | Ramachandran .... H04B 7/0408 455/63.4 |
| 2013/0294275 A1 | 11/2013 | Gorokhov |
| 2013/0336193 A1 | 12/2013 | Luo |
| 2013/0336249 A1 | 12/2013 | Zhao |
| 2014/0023001 A1 | 1/2014 | Huang |
| 2014/0029456 A1 | 1/2014 | Mallik |
| 2014/0055302 A1 | 2/2014 | Jia |
| 2014/0071894 A1 | 3/2014 | Kairouz |
| 2014/0079155 A1 | 3/2014 | Wang |
| 2014/0204857 A1 | 7/2014 | Mallik |
| 2014/0219117 A1 | 8/2014 | Meshkati |
| 2014/0219243 A1 | 8/2014 | Meshkati |
| 2014/0273884 A1 | 9/2014 | Mantravadi |
| 2014/0301309 A1 | 10/2014 | Luo |
| 2015/0063150 A1 | 3/2015 | Sadek |
| 2015/0063151 A1 | 3/2015 | Sadek |
| 2015/0063323 A1 | 3/2015 | Sadek |
| 2015/0070323 A1 | 3/2015 | Hong |
| 2015/0085686 A1 | 3/2015 | Chande |
| 2015/0139015 A1 | 5/2015 | Kadous |
| 2015/0163823 A1 | 6/2015 | Sadek |
| 2015/0180622 A1 | 6/2015 | Yoo |
| 2015/0255852 A1* | 9/2015 | Pan ................. G06F 1/1698 455/500 |
| 2015/0282077 A1 | 10/2015 | Yavuz |
| 2015/0319702 A1 | 11/2015 | Patel |
| 2015/0350919 A1 | 12/2015 | Patel |
| 2016/0088625 A1 | 3/2016 | Kadous |
| 2016/0095039 A1 | 3/2016 | Valliappan |
| 2016/0095040 A1 | 3/2016 | Valliappan |
| 2016/0112168 A1 | 4/2016 | Yoo |
| 2016/0128130 A1 | 5/2016 | Sadek |
| 2016/0234820 A1 | 8/2016 | Mallik |
| 2016/0255660 A1 | 9/2016 | Son et al. |
| 2016/0295502 A1* | 10/2016 | Yoon ................. H04W 52/0216 |
| 2016/0353482 A1 | 12/2016 | Valliappan |
| 2016/0381673 A1 | 12/2016 | Sun |
| 2017/0026976 A1 | 1/2017 | Yoo |
| 2017/0041766 A1 | 2/2017 | Vajapeyam |
| 2017/0048047 A1 | 2/2017 | Kadous |
| 2017/0048889 A1 | 2/2017 | Kadous |
| 2017/0093545 A1 | 3/2017 | Kadous |
| 2017/0142705 A1 | 5/2017 | Chendamarai Kannan |
| 2017/0163433 A1 | 6/2017 | Luo |
| 2017/0222771 A1 | 8/2017 | Chendamarai Kannan |
| 2017/0223739 A1 | 8/2017 | Mallik |
| 2017/0311346 A1 | 10/2017 | Chendamarai Kannan |
| 2017/0332288 A1 | 11/2017 | Sadek |
| 2017/0332338 A1 | 11/2017 | Mallik |
| 2018/0032516 A1 | 2/2018 | Mallik |
| 2018/0035463 A1 | 2/2018 | Mallik |
| 2018/0054348 A1 | 2/2018 | Luo |
| 2018/0054762 A1 | 2/2018 | Kadous |
| 2018/0054780 A1 | 2/2018 | Radulescu |
| 2018/0054848 A1 | 2/2018 | Yoo |
| 2018/0062801 A1 | 3/2018 | Zhang |
| 2018/0070242 A1 | 3/2018 | Damnjanovic |
| 2018/0077725 A1 | 3/2018 | Sun |
| 2018/0109957 A1 | 4/2018 | Fan |
| 2018/0110056 A1 | 4/2018 | Zhang |
| 2018/0124777 A1 | 5/2018 | Yerramalli |
| 2018/0124789 A1 | 5/2018 | Yerramalli |
| 2018/0131499 A1 | 5/2018 | Zhang |
| 2018/0132236 A1 | 5/2018 | Kadous |
| 2018/0139618 A1 | 5/2018 | Yerramalli |
| 2018/0139782 A1 | 5/2018 | Sadek |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167941 A1 | 6/2018 | Zhang |
| 2018/0176946 A1 | 6/2018 | Sun |
| 2018/0213486 A1 | 7/2018 | Yoo |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234830 A1 | 8/2018 | Wang |
| 2018/0235013 A1* | 8/2018 | Jung ................. H04W 74/006 |
| 2018/0241494 A1 | 8/2018 | Chendamarai Kannan |
| 2018/0242348 A1 | 8/2018 | Chendamarai Kannan |
| 2018/0249496 A1 | 8/2018 | Radulescu |
| 2018/0255584 A1 | 9/2018 | Sun |
| 2018/0279134 A1 | 9/2018 | Malik |
| 2018/0279292 A1 | 9/2018 | Luo |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310341 A1 | 10/2018 | Yerramalli |
| 2018/0324713 A1 | 11/2018 | Yoo |
| 2018/0343676 A1 | 11/2018 | Yerramalli |
| 2018/0352520 A1 | 12/2018 | Zhang |
| 2018/0352563 A1 | 12/2018 | Liu |
| 2018/0367362 A1 | 12/2018 | Sun |
| 2018/0368089 A1 | 12/2018 | Yerramalli |
| 2019/0007946 A1 | 1/2019 | Yerramalli |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0028999 A1 | 1/2019 | Yerramalli |
| 2019/0029019 A1 | 1/2019 | Zhang |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0045509 A1 | 2/2019 | Mallik |
| 2019/0053269 A1 | 2/2019 | Lei |
| 2019/0059001 A1 | 2/2019 | Yerramalli |
| 2019/0059102 A1 | 2/2019 | Yerramalli |
| 2019/0069325 A1 | 2/2019 | Yerramalli |
| 2019/0075591 A1 | 3/2019 | Sun |
| 2019/0075597 A1 | 3/2019 | Yerramalli |
| 2019/0081768 A1 | 3/2019 | Zhang |

(56) References Cited

U.S. PATENT DOCUMENTS

| | | |
|---|---|---|
| 2019/0082333 A1 | 3/2019 | Malik |
| 2019/0090178 A1 | 3/2019 | Liu |
| 2019/0090256 A1 | 3/2019 | Liu |
| 2019/0090273 A1 | 3/2019 | Yoo |
| 2019/0098656 A1 | 3/2019 | Chendamarai Kannan |
| 2019/0098663 A1 | 3/2019 | Zhang |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0104547 A1 | 4/2019 | Xue |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0124518 A1 | 4/2019 | Zhang |
| 2019/0124595 A1 | 4/2019 | Lei |
| 2019/0124613 A1 | 4/2019 | Liu |
| 2019/0124663 A1 | 4/2019 | Liu |
| 2019/0124694 A1 | 4/2019 | Chendamarai Kannan |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0150088 A1 | 5/2019 | Sun |
| 2019/0150198 A1 | 5/2019 | Sun |
| 2019/0158333 A1 | 5/2019 | Zhang |
| 2019/0159280 A1 | 5/2019 | Chakraborty |
| 2019/0166621 A1 | 5/2019 | Yerramalli |
| 2019/0173521 A1 | 6/2019 | Liu |
| 2019/0173611 A1 | 6/2019 | Liu |
| 2019/0174532 A1 | 6/2019 | Damnjanovic |
| 2019/0174542 A1 | 6/2019 | Lei |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0199786 A1 | 6/2019 | Mallik |
| 2019/0200385 A1 | 6/2019 | Xue |
| 2019/0223215 A1 | 7/2019 | Tian |
| 2019/0229788 A1 | 7/2019 | Zhang |
| 2019/0238177 A1 | 8/2019 | Liu |
| 2019/0238219 A1 | 8/2019 | Liu |
| 2019/0238284 A1 | 8/2019 | Liu |
| 2019/0239202 A1 | 8/2019 | Bhattad |
| 2019/0246410 A1 | 8/2019 | Zhang |
| 2019/0246425 A1 | 8/2019 | Zhang |
| 2019/0253219 A1 | 8/2019 | Fan |
| 2019/0261354 A1 | 8/2019 | Fakoorian |
| 2019/0268907 A1 | 8/2019 | Bhattad |
| 2019/0268933 A1 | 8/2019 | Sun |
| 2019/0274162 A1 | 9/2019 | Zhang |
| 2019/0280836 A1 | 9/2019 | Bhattad |
| 2019/0288761 A1 | 9/2019 | Mallik |
| 2019/0305834 A1 | 10/2019 | Fakoorian |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313260 A1 | 10/2019 | Zhang |
| 2019/0313419 A1 | 10/2019 | Fakoorian |
| 2019/0319767 A1 | 10/2019 | Sun |
| 2019/0320420 A1 | 10/2019 | Zhang |
| 2019/0320424 A1 | 10/2019 | Yerramalli |
| 2019/0320452 A1 | 10/2019 | Zhang |
| 2019/0327047 A1 | 10/2019 | Liu |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335456 A1 | 10/2019 | Yerramalli |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0349969 A1 | 11/2019 | Chakraborty |
| 2019/0349992 A1 | 11/2019 | Zhang |
| 2019/0349998 A1 | 11/2019 | Bhattad |
| 2019/0357252 A1 | 11/2019 | Sun et al. |
| 2019/0357255 A1 | 11/2019 | Sun et al. |
| 2019/0363773 A1 | 11/2019 | Yerramalli et al. |
| 2019/0364468 A1 | 11/2019 | Yerramalli et al. |
| 2019/0364579 A1 | 11/2019 | Zhang et al. |
| 2019/0373571 A1 | 12/2019 | Damnjanovic et al. |
| 2019/0373640 A1 | 12/2019 | Sun et al. |
| 2019/0379561 A1 | 12/2019 | Zhang et al. |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0394790 A1 | 12/2019 | Damnjanovic et al. |
| 2020/0008107 A1 | 1/2020 | Zhang et al. |
| 2020/0008108 A1 | 1/2020 | Yoo |
| 2020/0008131 A1 | 1/2020 | Chakraborty et al. |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0029221 A1 | 1/2020 | Xue et al. |
| 2020/0037336 A1 | 1/2020 | Sun et al. |
| 2020/0045556 A1 | 2/2020 | Xue |
| 2020/0045623 A1 | 2/2020 | Damnjanovic |
| 2020/0045744 A1 | 2/2020 | Sun |
| 2020/0052870 A1 | 2/2020 | Yerramalli |
| 2020/0053599 A1 | 2/2020 | Damnjanovic |
| 2020/0053739 A1 | 2/2020 | Xue |
| 2020/0059346 A1 | 2/2020 | Yoo |
| 2020/0059854 A1 | 2/2020 | Li et al. |
| 2020/0067639 A1 | 2/2020 | Lin |
| 2020/0067748 A1 | 2/2020 | Zhang |
| 2020/0068435 A1 | 2/2020 | Zhang |
| 2020/0077394 A1 | 3/2020 | Damnjanovic |
| 2020/0077439 A1 | 3/2020 | Sun |
| 2020/0084759 A1 | 3/2020 | Liu |
| 2020/0099436 A1 | 3/2020 | Malik |
| 2020/0100116 A1 | 3/2020 | Chakraborty |
| 2020/0100247 A1 | 3/2020 | Zhang |
| 2020/0100250 A1 | 3/2020 | Zhang |
| 2020/0107335 A1 | 4/2020 | Xue |
| 2020/0107360 A1 | 4/2020 | Xue |
| 2020/0107364 A1 | 4/2020 | Xue |
| 2020/0169312 A1 | 5/2020 | Black et al. |
| 2020/0287604 A1* | 9/2020 | Gao ............... H04B 7/0617 |
| 2021/0014085 A1 | 1/2021 | Chen et al. |
| 2021/0328838 A1 | 10/2021 | Black et al. |
| 2021/0328920 A1 | 10/2021 | Kadous et al. |
| 2021/0329486 A1 | 10/2021 | Kadous et al. |
| 2021/0376973 A1 | 12/2021 | Mallik et al. |
| 2022/0005286 A1* | 1/2022 | Chen .................. G06T 17/10 |
| 2022/0166470 A1* | 5/2022 | Sun .................. H04B 17/336 |
| 2022/0345907 A1* | 10/2022 | Yu .................. H04B 7/0617 |

OTHER PUBLICATIONS

Nitsche, et al., "IEEE 802.11ad: Directional 60 GHz Communication for Multi-Gbps Wi-Fi," IEEE Communications Magazine, Dec. 2014.

Wu, et al., "Performance Analysis and Enhancement of Beamforming Training in 802.11ad," IEEE Transactions of Vehicular Technology, vol. 69, No. 5, May 2020.

International Search Report issued in International Application No. PCT/US2021/072918, mailed on May 10, 2022.

Written Opinion issued in International Application No. PCT/US2021/072918, mailed on May 10, 2022.

Search Report in European Patent Application No. EP 21908026.4, dated Jan. 9, 2025, in 12 pages.

Joongheon et al., "Fast millimeter-wave beam training with receive beamforming", Journal of Communications and Networks, vol. 16(5):512-522, Oct. 2014.

(56) References Cited

OTHER PUBLICATIONS

European Search Report in European Patent Application No. EP 21908026.4, dated Oct. 18, 2024, in 14 pages.

* cited by examiner

WIRELESS COMMUNICATION WITH QUASI-OMNI AND DIRECTIONAL BEAMS

CROSS REFERENCE TO PRIORITY APPLICATION

This application claims the benefit of priority of U.S. Provisional Patent Application No. 63/126,427, filed Dec. 16, 2020 and titled "WIRELESS COMMUNICATION WITH QUASI-OMNI AND DIRECTIONAL BEAMS," the disclosure of which is hereby incorporated by reference herein in its entirety and for all purposes.

BACKGROUND

Technical Field

Embodiments of this disclosure relate to for wireless communication systems.

Description of Related Technology

The types of modern computing devices continue to increase along with the differing and dynamic needs of each device. The wireless communication systems providing services to such devices are facing increasing constraints on resources and demands for quality and quantities of service. Accordingly, improvements in providing wireless communication services, such as in a systems with wireless communication signals at frequencies above 20 gigahertz (GHz), are desired.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a wireless communication device that includes at least one antenna and a processor in communication with the at least antenna. The processor is configured to cause the wireless communication device to wirelessly transmit a quasi-omni beam to a network node in a first mode and wirelessly transmit a directional beam to the network node in a second mode. The quasi-omni beam and the directional beam are each associated with a radio frequency signal having a frequency of at least 20 gigahertz.

The first mode can be a training mode and the second mode can be a data transmission mode.

The processor can be configured to select a directional receive beam based on the quasi-omni beam wirelessly transmitted by the network node in the first mode. The processor can configure the wireless communication device to receive a data transmission from the network node over the directional receive beam. The data transmission can be a downlink data transmission.

The processor can be configured to select a directional receive beam based on a quasi-omni beam wirelessly transmitted by the network node during a training mode, and store information identifying the directional receive beam. The processor can be configured to determine to wirelessly transmit over the directional beam during a data transmission mode based on the stored information to invoke reciprocity, where the directional beam corresponds to the directional receive beam. The wireless communication device can be arranged to receive directional beams while the network node wirelessly transmits the quasi-omni beam during the training mode. The information identifying the directional receive beam can be stored in a look-up table.

The directional beam can be associated with a wireless communication in compliance with an 802.11 standard. The directional beam can be associated with cellular communication.

Another aspect of this disclosure is a method of wireless communication. The method includes receiving, by a wireless communication device, a quasi-omni beam wirelessly transmitted by a network node. The wireless communication device and the network node wirelessly communicate with a radio frequency signal having a frequency of at least 20 gigahertz. The method includes selecting a directional receive beam for the wireless communication device based on the quasi-omni beam wirelessly transmitted by the network node. The method also includes receiving, by the wireless communication device, data from the network node over the selected directional receive beam.

The radio frequency signal can be compliance with an 802.11 standard. The radio frequency signal can be an 802.11ad signal.

The radio frequency signal can be cellular signal. The radio frequency signal can have a frequency within Frequency Range 2 for New Radio.

The method can include selecting a directional transmit beam for the wireless communication device, and wirelessly transmitting, by the wireless communication device, to the network node over the directional transmit beam. Selecting the directional transmit beam can be based on information identifying the directional receive beam.

The method can include, while the wireless communication device is configured to receive the quasi-omni beam, receiving an indication from the network node identifying that a data transmission is coming from the network node. In response to receiving the indication, the method can include configuring the wireless communication device to receive from the network node over the directional receive beam. The indication from the network node can include an identifier included in at least one of a Request to Send (RTS) or a Clear to Send (CTS).

The method can include initiating a training session that includes selecting the directional receive beam based on a request from the network node to start the training session, here the request from the network node indicates that the wireless communication device will receive a data transmission from the network node after the training session.

Another aspect of this disclosure is a method of wireless communication. The method includes receiving, by a first node, a quasi-omni beam wirelessly transmitted by a second node in a training mode, wherein the first node and the second node wirelessly communicate with a radio frequency signal having a frequency of at least 20 gigahertz; configuring the first node to receive a directional receive beam from the second node, wherein the directional receive beam is selected based on the quasi-omni beam wirelessly transmitted by the second node in the training mode; and receiving, by the first node, data from the second node over the directional receive beam in a data transmission mode.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
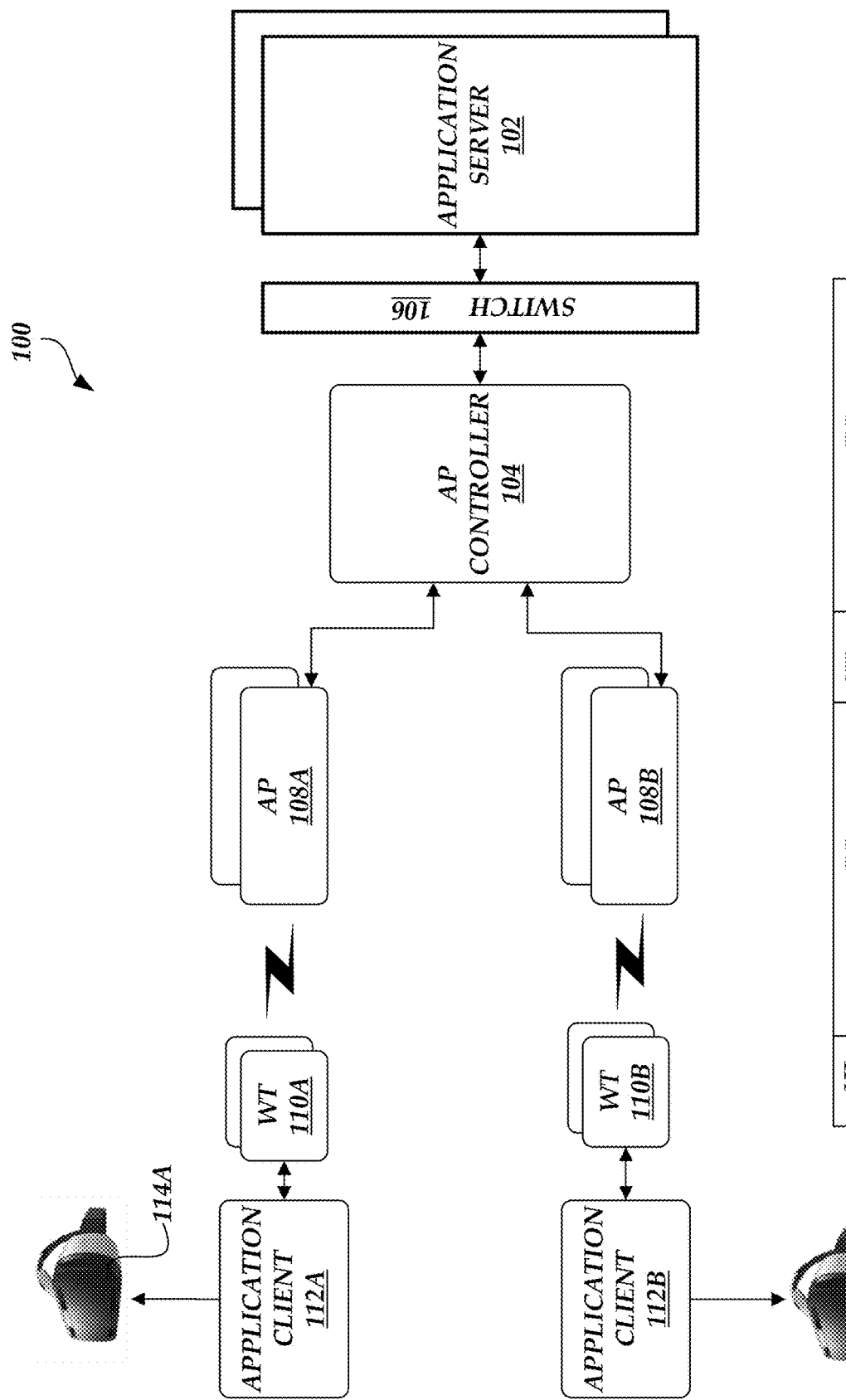
FIGS. 1A, 1B, and 1C illustrate an example wireless communication environment in according with embodiments of this disclosure.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

This disclosure provides technical solutions related to reliable use of the huge assets of millimeter wave (mmW) spectrum between licensed and unlicensed. The inventors realized that (1) the technology is limited in coverage by physics and (2) the technology can encounter significant link quality reduction in non-line of sight scenarios. Calls to many cells of overlapping coverages helps the range of the technology and/or increases the probability of having an access node with line of sight to the user. Umbrella coverage can be created from multiple nodes, in a way that a terminal does not need to know or react to. This can function more like a super cell. A cloud radio access network (C-RAN) architecture can be utilized.

Aspects of this disclosure relate to wireless communication between a wireless communication device and a network node with hybrid quasi-omni beam and a directional beam. This wireless communication can occur a relatively high frequencies, such as at radio frequencies of at least 20 gigahertz and/or mmW frequencies. At such relatively high frequencies, signals can be more lossy than at lower frequencies. This can present technical challenges. A wireless communication device can wirelessly transmit/receive a quasi-omni beam to/from a network node in a first mode and wirelessly transmit/receive a directional beam to/from the network node in a second mode. The first mode can be a training mode, and the second mode can be a data transmission mode. The wireless transmissions can be in compliance with an 802.11 standard, such as an 802.11ad standard. Alternatively, the wireless transmissions can be cellular communications, such as New Radio (NR) communications within Frequency Range 2 (FR2).

Methods of training and wireless data transmission are disclosed. A wireless communication device can receive a quasi-omni beam wirelessly transmitted by a network node. A directional receive beam for the wireless communication device can be selected based on the quasi-omni beam wirelessly transmitted by the network node. The wireless communication device can receive downlink data from the network node over the selected directional receive beam. The wireless communications can involve radio frequency signals having a frequency of at least 20 GHz. The wireless communication device can receive an 802.11ad transmission over the directional receive beam. Wireless signals associated with 802.11ad can have a frequency in a range from about 57 GHz to about 71 GHz. The wireless communication device can receive cellular transmission over the directional receive beam, such as a NR transmission within FR2. FR2 can include radio frequency signals with a frequency of above 24 GHz. FR2 can be from 24.25 GHz to 52.6 GHz, for example, as defined in a recent NR standard.

In embodiments disclosed herein, there is a training phase where a training node transmits a quasi-omni beam and a trained node receives with different beams (directional beam receiving). The training node can be referred to as a transmit node. The trained node can be referred to as a received node. In certain instances, the transmit node can be a network node (e.g., an AP) and the receive node can be a wireless terminal (e.g., a STA). In some other instances, the transmit node can be a wireless terminal (e.g., a STA) and the receive node can be a network node e (e.g., an AP). The receiving node can build a look-up table and/or otherwise store information on the best beam from each transmit node after and/or during the training period. In some instances, the trained node can use the best beam for receiving from a particular transmit node to transmit to the transmit node, invoking the assumption of reciprocity in the links.

Although embodiments disclosed herein may relate to communications between a user terminal and a network node, any suitable principles and advantages disclosed herein can be applied to wireless communications within a network system and/or between user terminals. For example, in some instances, a training node and a trained node can both be part of a network system. As another example, in some other instances, a training node and a trained node can both be user terminals.

During a data session after training, a transmit node can signal a receiving node that a data transmission is coming. During this phase, the receiving node is configured for quasi-omni beams. In response to the receiving node (e.g., a STA) receiving the signal indicating that the receiving node is about to receive from a specific network node (e.g., an AP), the receiving node can access the corresponding best beam with the specific network node from information stored (e.g., in a look-up table) during the training mode.

Signaling from the network node to the receiving node can happen over a Request to Send (RTS) or a Clear to Send (CTS., for example, by populating the sig field with a proprietary receive node identifier. Alternatively, signaling from the network node to the receiving node can happen by the network node sending a request to the receiving node to start training, and such a request can indicate to the receiving node that after training the receiving node should expect data from this particular network node. Thus, the receiving node can select a directional beam for receiving data from the network based on the request in this example.

The transmitting node and the receiving node can each include any suitable physical hardware to perform any suitable operations disclosed herein. Each of these nodes can store computer-executable instructions that, when executed by a processor, cause the node to perform any suitable functionality disclosed herein. The processor can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform any suitable combination of the functions described herein. Each node can also include any suitable number of antennas for wireless communication.

Figure 1B:
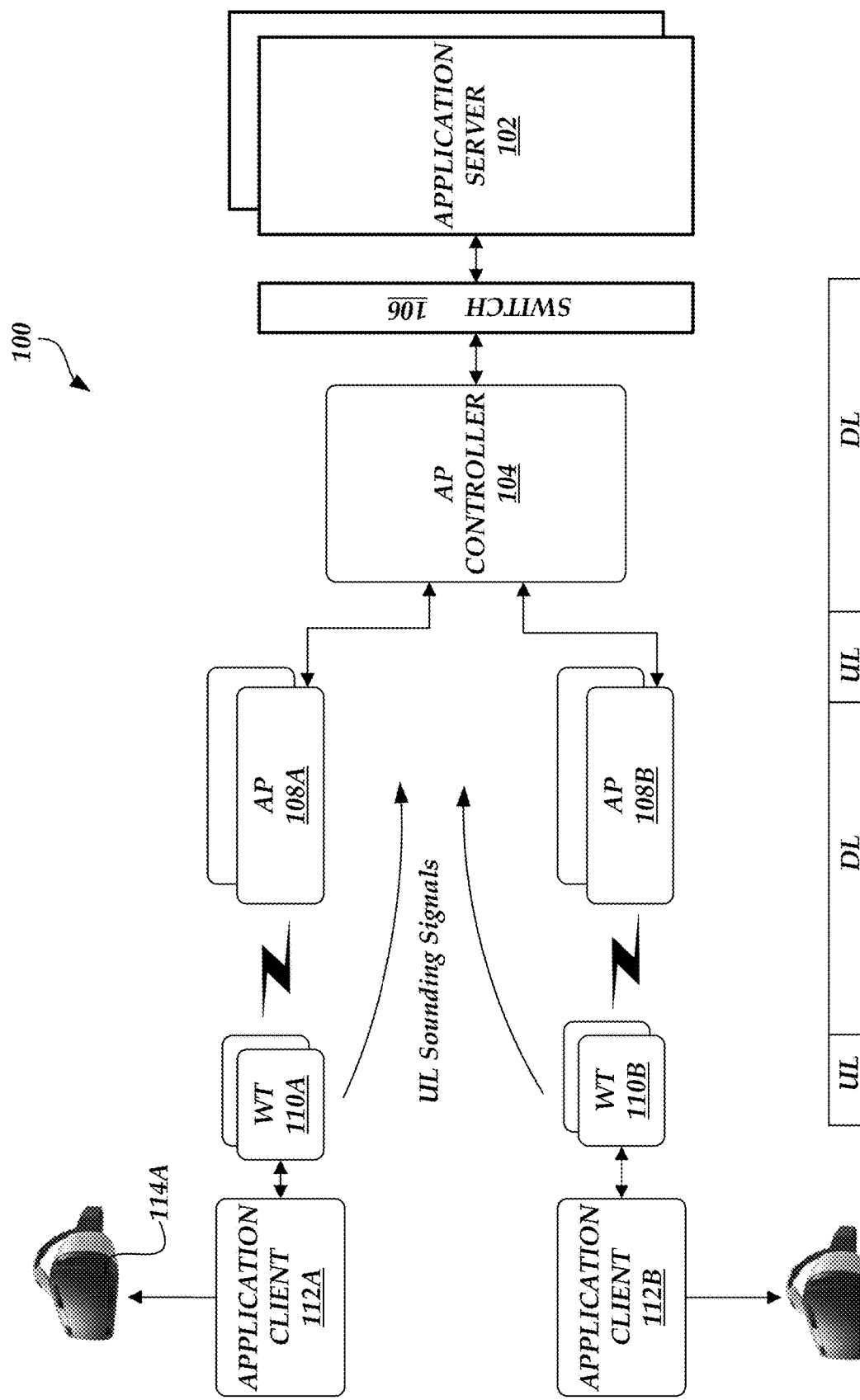
Figure 1C:
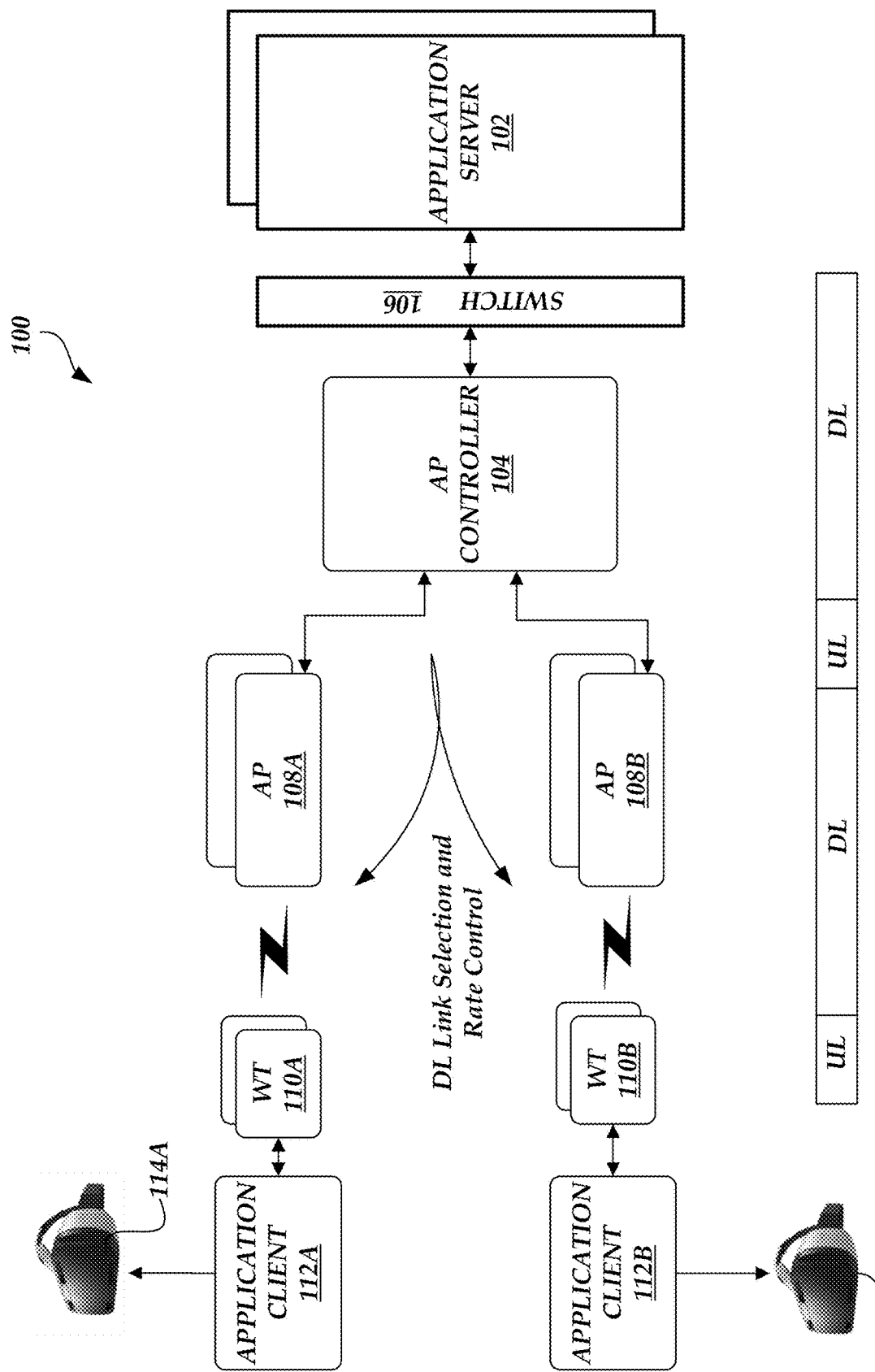

FIGS. 1A, 1B, and 1C illustrate an example wireless communication environment 100. One or more applications servers 102 are in communication with an access point (AP) controller 104. There can be a switch 106 coupled between application servers 102 and the AP controller 104. The AP controller 104 can be connected to a plurality of wireless APs 108A, 108B. The AP controller 104 and the APs 108A, 108B can be connected via physical connection, such as a wired and/or optical fiber connection. The APs 108A, 108B can wirelessly communicate with a plurality of wireless terminals 110A, 110B, such as stations (STAs). The APs 108A, 108B can be referred to as wireless APs (WAPs). The wireless terminals 110A, 110B can each run a respective application client 112A, 112B. One or more wireless terminals, such as STAs, can be associated with a respective head-mounted display (HMD) 114A, 114B in certain applications.

The one or more application servers 102 can send data to the AP controller 104. The AP controller 104 sends the data to APs 108A, 108B that wirelessly communicate with wireless terminals 110A, 110B. Wireless radio frequency signals with frequencies above 20 GHz and/or in the mmW range can be communicated via wireless links between the APs 108A, 108B and wireless terminals 110A, 110B. In certain applications, APs 108A, 108B and wireless terminals 110A, 110B wirelessly communicate using 802.11ad technology.

As shown in FIG. 1B, wireless terminals 110A, 110B can send uplink reference signals. For example, the uplink sounding signals, such as an uplink Sounding Reference Signal (SRS), can be wirelessly transmitted from the wireless terminals 110A, 110B to the APs 108A, 108B. The uplink reference signals can be referred to as uplink sounding signals in certain applications. The AP controller 104 can receive uplink reference signals via APs 108A, 108B. The AP controller 104 can have full visibility between any wireless terminal 110A, 110B and any AP 108A, 108B. Based on the uplink reference signals, the AP controller 104 can perform downlink link selection and rate control for the APs 108A, 108B to wirelessly transmit data to the wireless terminals 110A, 110B. The AP controller 104 can direct downlink selection and rate control as shown in FIG. 1C.

Figure 2:
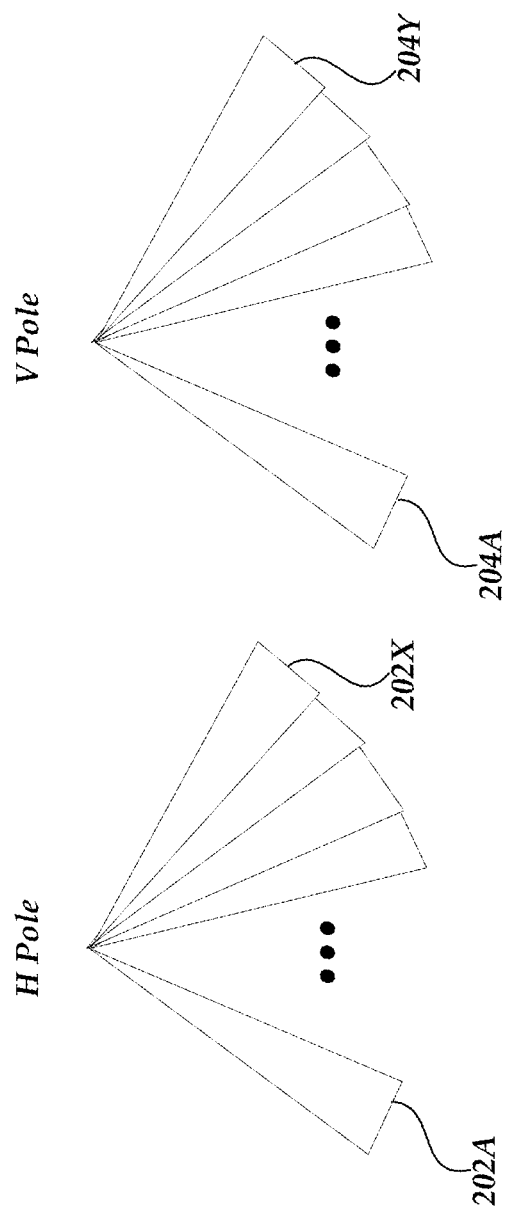
FIG. 2 illustrates example horizontally polarized and vertically polarized beams.

Millimeter wave (mmW) technology can involve beamforming for wireless communication. A set of horizontally and/or vertically polarized beams can be used by an AP and/or a STA. Example horizontally polarized beams 202A to 202X and vertically polarized beams 204A to 204Y are shown in FIG. 2. As one example, there can be 28 horizontally polarized beams and 28 vertically polarized beams. Beams are part of a codebook having a codebook size. Each beam has a beamwidth from narrow to the widest possible. The widest possible beam can be referred to as a quasi-omni beam. A quasi-omni beam can be referred to as an omni beam in certain instances. A quasi-omni beam typically has a codebook with 1 entry. In contrast to quasi-omni beams, directional beams are narrower. This mmW technology can be used in applications where radio frequency signals having frequencies of greater than 20 GHz are wirelessly transmitted.

Some systems involve directional beams and beamforming at APs for wirelessly transmitting and receiving and quasi-omni beams at STAs for wirelessly transmitting and receiving. Such technical features can facilitate system design, but reduce coverage. Technology disclosed herein provides technical solutions related to mitigating and/or overcoming this reduced coverage.

When STAs send reference signals, such as pilot signals, quasi-omni beams can reach a relatively large number of APs. In larger coverage areas, STAs wirelessly communicating with quasi-omni beams can cause a performance hit. This can be due to relatively low power of wireless communication signals in such larger coverage areas.

Wireless transmission and/or reception at STAs with directional beams for beamforming can be desirable. With narrower directional beams, higher power signals can be received. A STA can send a reference signal with a quasi-omni beam and then the STA can be trained so that a best beam for wirelessly receiving and/or transmitting a directional beam can be found. The directional beam can be used in beamforming. In some instances, a desirable beam that is not necessarily the best beam for wireless communication on a directional beam can be selected in accordance with any suitable principles and advantages disclosed herein.

Figure 3:
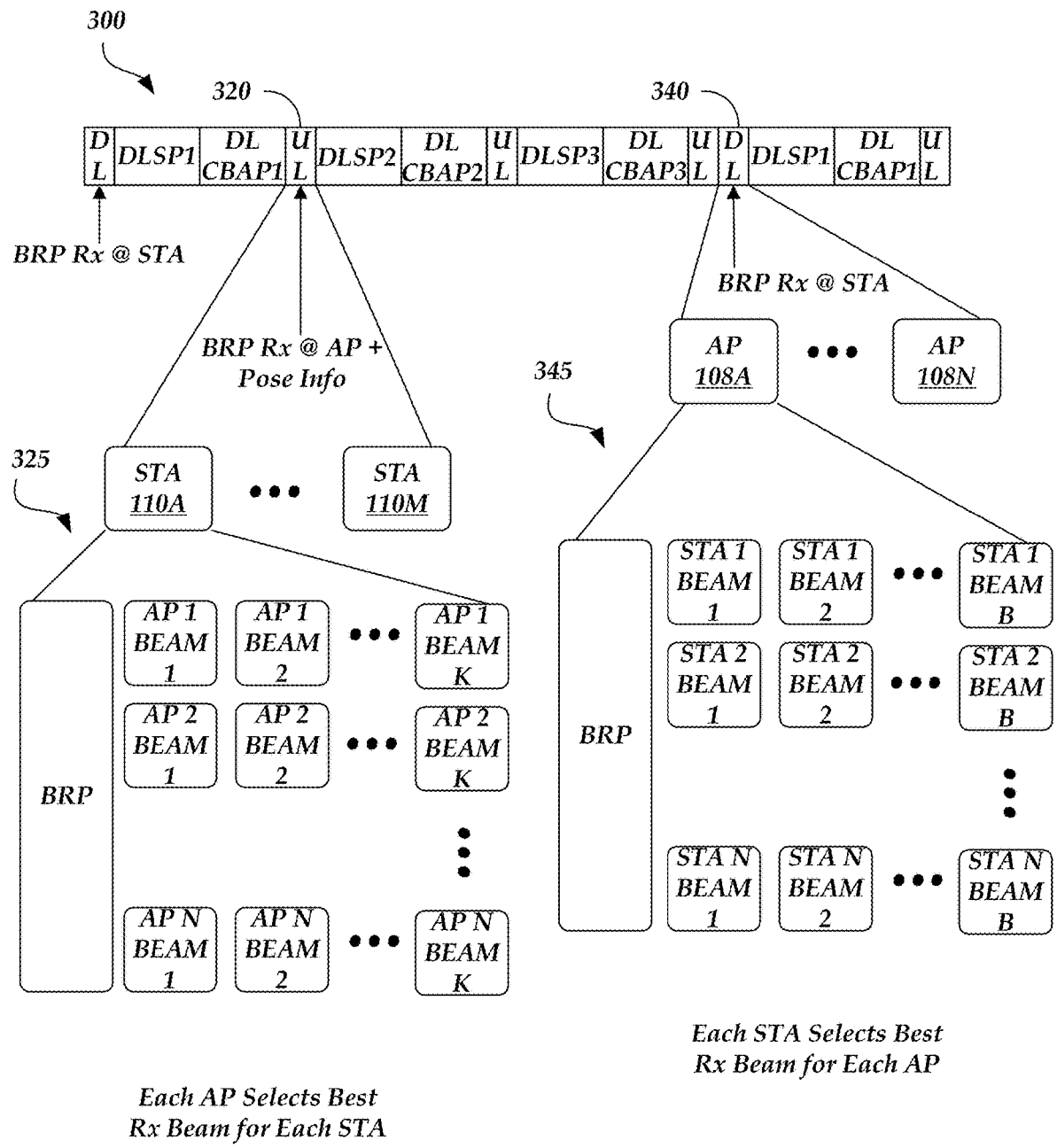
FIG. 3 includes a timing diagram for uplink and downlink transmissions in a wireless communication environment and timing diagrams associated with access point and station receiver training according to an embodiment.

FIG. 3 is a diagram associated with each AP selecting a best receive beam for each STA through training and each STA selecting a best receive beam for each AP through training. FIG. 3 includes a timing diagram 300 for uplink and downlink transmissions in a wireless communication environment, such as the wireless communication environment 100 shown in FIGS. 1A to 1C. During time slot 320, AP receiver training is performed. FIG. 3 includes a timing diagram 325 related to AP receiver training during the time slot 320. During time slot 340, STA receiver training is performed. The time slot 340 can be part of a downlink transmission time slot. FIG. 3 includes a timing diagram 345 related to STA receiver training during the time slot 340. Training can be periodic. As one example, training can occur every video frame and/or about every 11 milliseconds (ms).

AP training can involve periodic instances of a beam refinement protocol (BRP). The timing diagram 325 illustrates timing of APs receiving from a STA for a BRP. During this process, STAs 110A to 110M transmit quasi-omni beams and APs are receiving on directional beams. For each instance, STAs 110A to 110M can time division multiplex (TDM) in back-to-back slots. STAs can transmit one at a time from STA 1 to STA M during different time slots. The timing diagram 325 illustrates timing for APs receiving from one STA 110A. In each slot, the STA 110A transmits a quasi-omni beam over multiple instances and an AP can sweep different receiving beams. During any STA transmission, such as a STA 1 transmission, all APs can listen concurrently on beam 1, then the APs can switch to beam 2 and so on until beam K. At the end of the training period where each STA 110A to 110M transmits, the AP has a quantitative measure of link quality for the link of each receive beam with each STA. The best receive beam for the AP can be selected for each corresponding STA. The selected receive beam can be used by the AP as a directional beam for receiving. The best receive beam can be used as a transmit beam for the AP to transmit to the corresponding STA if channel reciprocity is invoked. If channel reciprocity is not invoked, the training can be performed where each STA receives with a quasi-omni beam and each AP 108A to 108N sweeps its transmit beam. Then a transmit beam can be selected based on the sweep. The training can be defined in a standards procedure for BRP for receiving and/or transmitting.

Periodic training procedures can be repeated periodically for the STA training in a mirrored fashion. APs 108A to 108N can transmit quasi-omni beams to STAs. The APs 108A to 108N can TDM in back-to-back slots. The timing diagram 345 illustrates timing for STAs receiving from one AP 108A. In each slot, the AP 108A transmits a quasi-omni beam over multiple instances. A STA can sweep different receive beams. During any AP transmission, such as an AP 108A transmission, all STAs can listen concurrently on beam 1, then the STAs can switch to beam 2 and so on until beam B. At the end of the training period where each AP 108A to 108N transmits, the STA has a quantitative measure of link quality for the link of each receive beam with each AP. The STA can select a best receive beam for each AP. The selected receive beam can be used by the STA as a directional beam for receiving a data transmission. The STA can use channel reciprocity and/or additional training to determine a best transmit beam for each AP.

The training procedures can refresh a database of beams between AP and STAs for transmit and/or receive each period.

Figure 4:
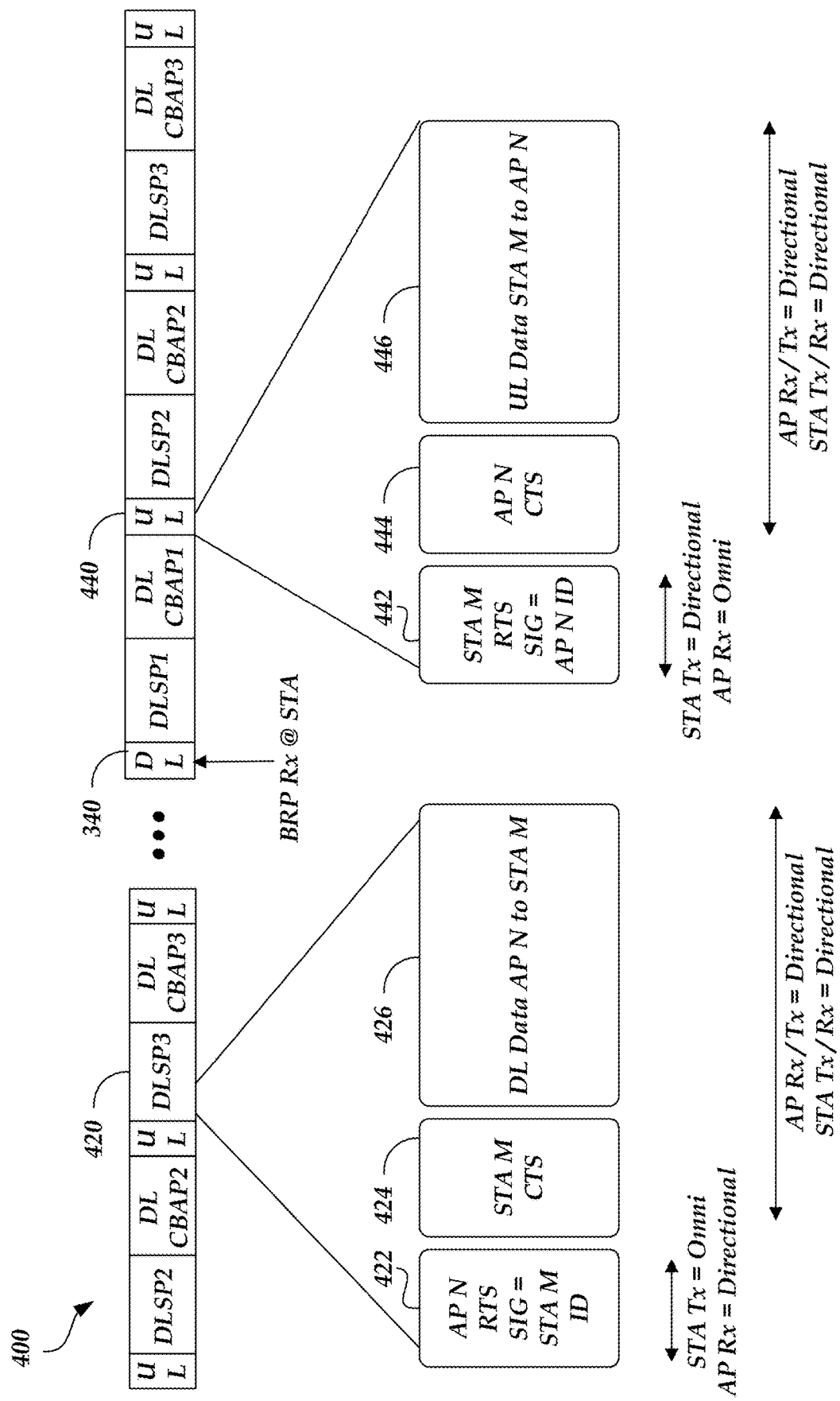
FIG. 4 includes a timing diagram of uplink and downlink communications together with illustrations related to communications sent between a station and an access point during particular time slots.

FIG. 4 is a diagram associated with an example data transmission between a STA and an AP using directional beams at both the AP and the STA. FIG. 4 includes a timing diagram 400 of uplink and downlink communications together with illustrations related to specific communications sent between the STA and the AP during particular time slots. Before data transmission, the STA can transmit quasi-omni beams for training, for example, as discussed above. For downlink data transmission between an AP and a STA, a particular AP can be identified to the STA for the STA to select a directional beam for wireless communication with the particular AP. The selected directional beam can be used in beamforming.

Downlink data transmission during downlink time slot 420 will now be discussed. Before downlink data transmission, a given AP-STA link can be established by an AP sending a Request to Send (RTS) to the STA with an identifier of the STA at communication 422. For example, the RTS can include the index of the STA added in the sig field. The STA can be operating with quasi-omni beams at this stage. The STA can transmit a quasi-omni beam and an AP can receive on a directional beam for the communication 422. The RTS can let a given STA know that the STA will be receiving. The intended STA can select the best directional beam the STA has with the initiating AP (from the training session). The STA can use the selected directional beam for a Clear to Send (CTS) at communication 424 and receiving a data downlink data transmission from an AP to a STA at communication 426. For the CTS, the STA transmits with a directional beam and the AP receives with the selected directional beam. For the downlink data transmission, the AP transmits with a directional beam and the STA receives with the selected directional beam. The selected directional beam can be used in beamforming.

Uplink data transmission can be a mirrored equivalent of downlink data transmission. An uplink data transmission for uplink time slot 440 will now be discussed. A STA can send an RTS to an AP with an AP index at communication 442. The STA can transmit a direction beam and the AP can receive quasi-omni for communication 442. The AP can use the selected directional beam for a CTS at communication 444, where the AP transmits a directional beam and the STA receives a directional beam. The STA can then send uplink data to the AP on a selected beam at communication 446. In the uplink data transmission, a STA transmits with the selected directional beam and the AP receives with a directional beam. The selected directional beam can be used in beamforming.

Figure 5:
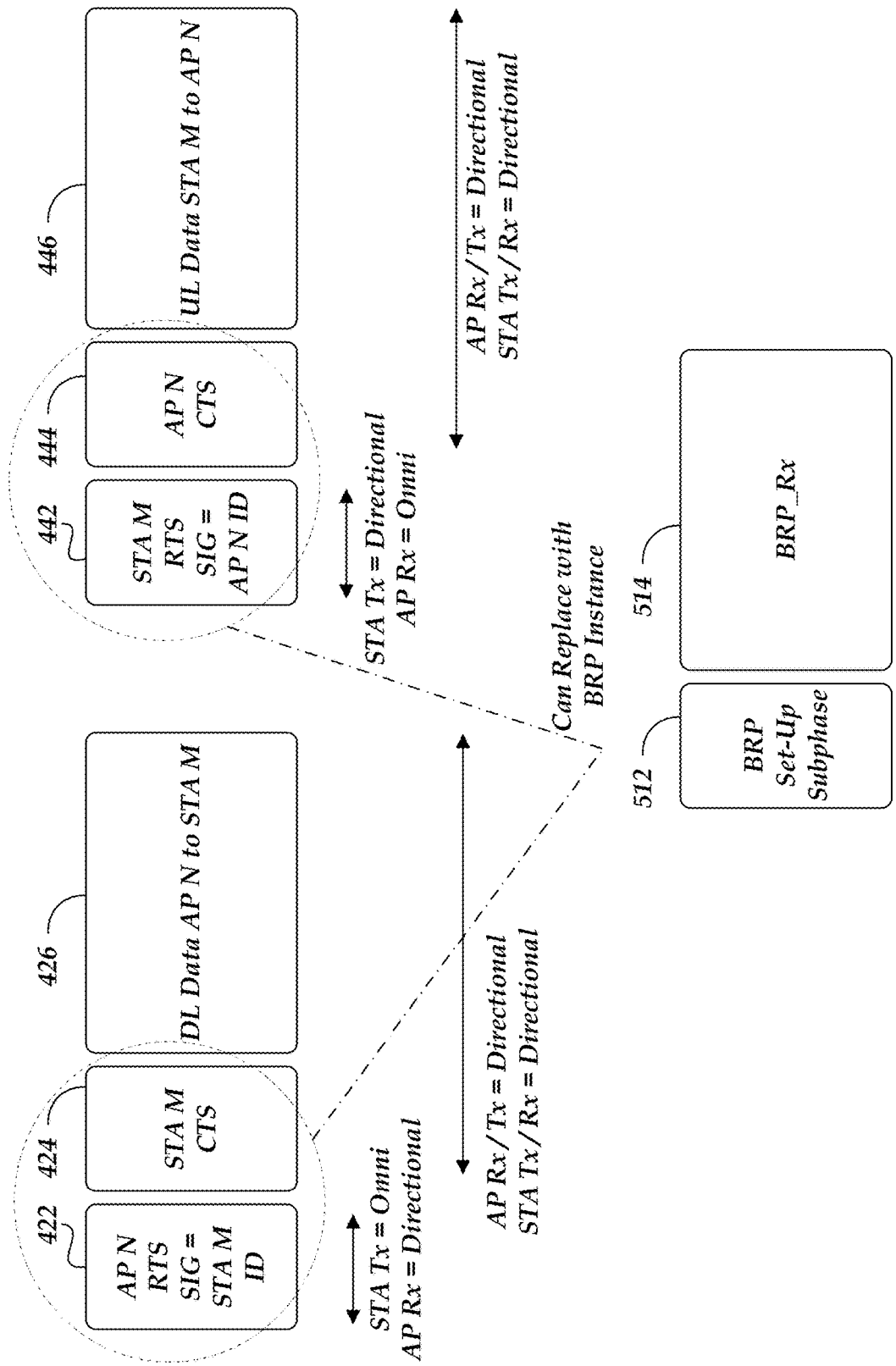
FIG. 5 is a diagram associated with an example data transmission between a station and an access point using directional beams at both the access point and the station.

FIG. 5 is a diagram associated with an example data transmission between a STA and an AP using directional beams at both the AP and the STA. To avoid use of a STA/AP index in downlink/uplink initiation, a BRP phase can be used for training the AP and/or the STA in certain applications. A BRP set-up sub-phase communication 512 and a BRP receive communication 514 can be implemented in place of RTS and CTS communications 422 and 424 or 442 and 444. The intended node can use a beam based on pre-training and/or based on any suitable training session disclosed herein. A training can be performed to select a best directional beam for a STA to wirelessly communicate with an AP. Then the selected beam can be used to wirelessly communicate data between the AP and the STA. With this solution, a combined procedure for a training session and data transmission can be performed. Accordingly, a separate dedicated periodic training may not be needed. The training and data transmission in FIG. 5 can involve 802.11ad compliant packets in certain applications.

Figure 6:
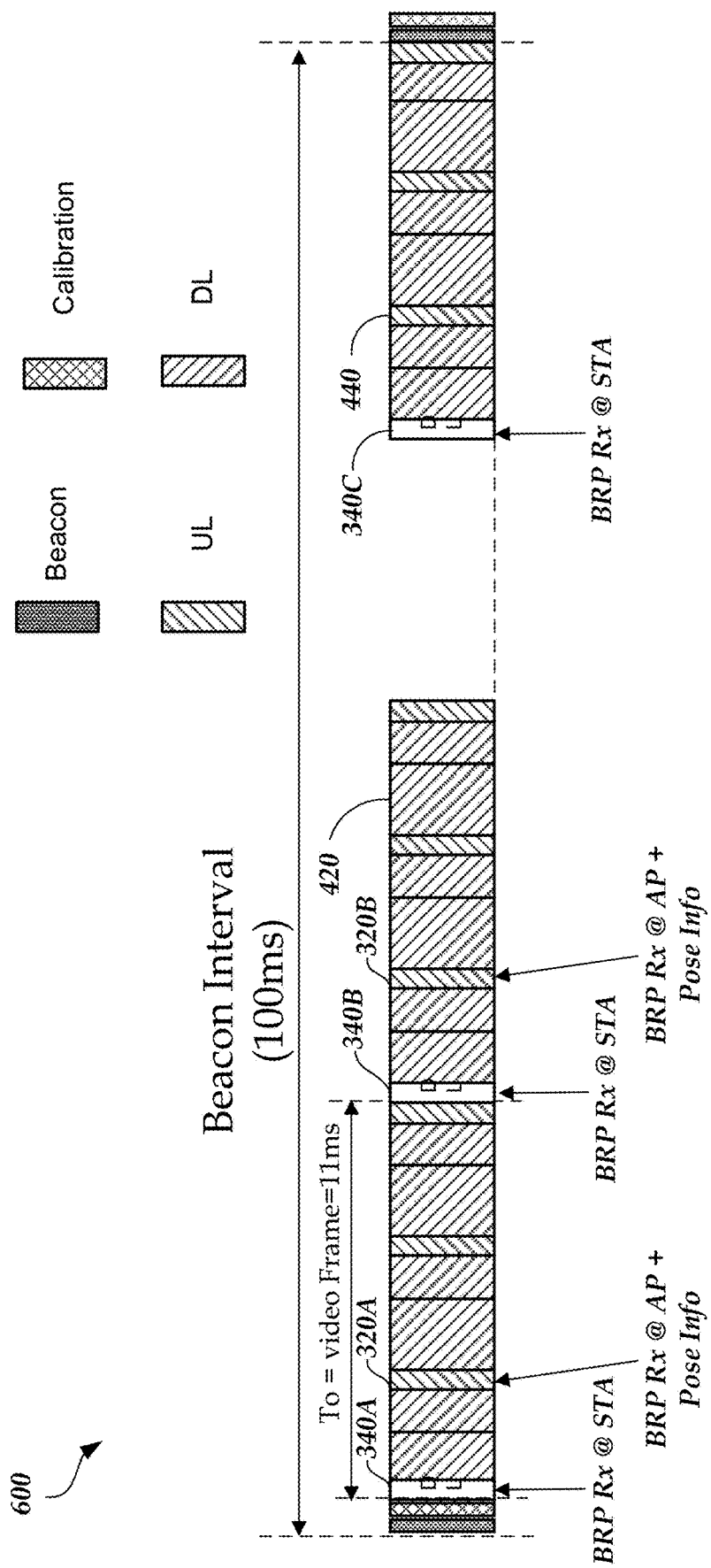
FIG. 6 is a timing diagram associated with training and data transmission according to an embodiment.

FIG. 6 is a timing diagram 600 that illustrates training and data transmission. This training and data transmission can be performed in accordance with any suitable principles and advantages disclosed herein.

The timing diagram 600 includes a beacon and calibration time slot followed by 9 video frame slots. The beacon and calibration time slot is 1 ms in FIG. 6. Each video frame is 11 ms in FIG. 6. The beacon interval is 100 ms in FIG. 6. Each video frame can include at least one BRP receive at STAs and at least one BRP receive at APs. Wireless data communications between APs and STAs using directional beams at both the APs and the STAs can be performed in accordance with any suitable principles and advantages discussed with reference to FIG. 4 and/or FIG. 5.

The BPR receive at STAs can be during a downlink slot 340A, 340B, 340C at the beginning of the video frame. The BRP at the STAs can select a best receive beam for each AP. This can be implemented in accordance with any suitable principles and advantages discussed with reference to the timing diagram 345 of FIG. 3.

The BPR receive at APs can be during an uplink slot 320A, 320B of a video frame. The BRP at the APs can select a best receive beam for each STA. This can be implemented in accordance with any suitable principles and advantages discussed with reference to the timing diagram 325 of FIG. 3.

Downlink data can be transmitted from one or more APs to one or more STAs during downlink time slot 420 in accordance with any suitable principles and advantages discussed with reference to FIGS. 4 and/or 5. Such downlink data transmission can be implemented in one or more downlink time slots in each video frame.

Uplink data can be transmitted from one or more APs to one or more STAs during uplink time slot 440 in accordance with any suitable principles and advantages discussed with reference to FIGS. 4 and/or 5. Such uplink data transmission can be implemented in one or more uplink time slots in each video frame.

Although embodiments disclosed herein can be discussed with reference to STAs and APs for illustrative purposes, any suitable principles and advantages disclosed herein can be applied to wireless communication between wireless communication devices and network nodes. For example, in certain cellular applications, a wireless communication device can be a user equipment and a network node can be a remote radio unit (RRU) of a cellular network. Moreover, any suitable principles and advantages disclosed herein can be applied to wireless communication between a plurality of wireless communication nodes. Such wireless communication nodes can include a plurality of network nodes. Alternatively or additionally, such wireless communication nodes can include a plurality of user wireless communication terminals.

Wireless communication devices can include one or more antennas and a processor configured to cause the wireless communication device to perform any suitable functionality of a wireless communication device disclosed herein. The wireless communication device can include any suitable physical hardware to perform any of the operations do the wireless communication devices disclosed herein. The wireless communication device can store computer-executable instructions that, when executed by the processor, cause the wireless communication device to perform any suitable functionality disclosed herein. The processor can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform any suitable combination of the functions described herein. The processor can be implemented by any suitable combination of computing devices and/or discrete processing circuits in certain applications. The processor can be programmed by specific executable instructions to perform a method with any suitable combination of features disclosed herein. The processor can perform baseband processing. Such a processor can be referred to as a baseband processor. The one or more antennas can wirelessly transmit and/or receive with both quasi-omni beams and directional beams.

Figure 7:
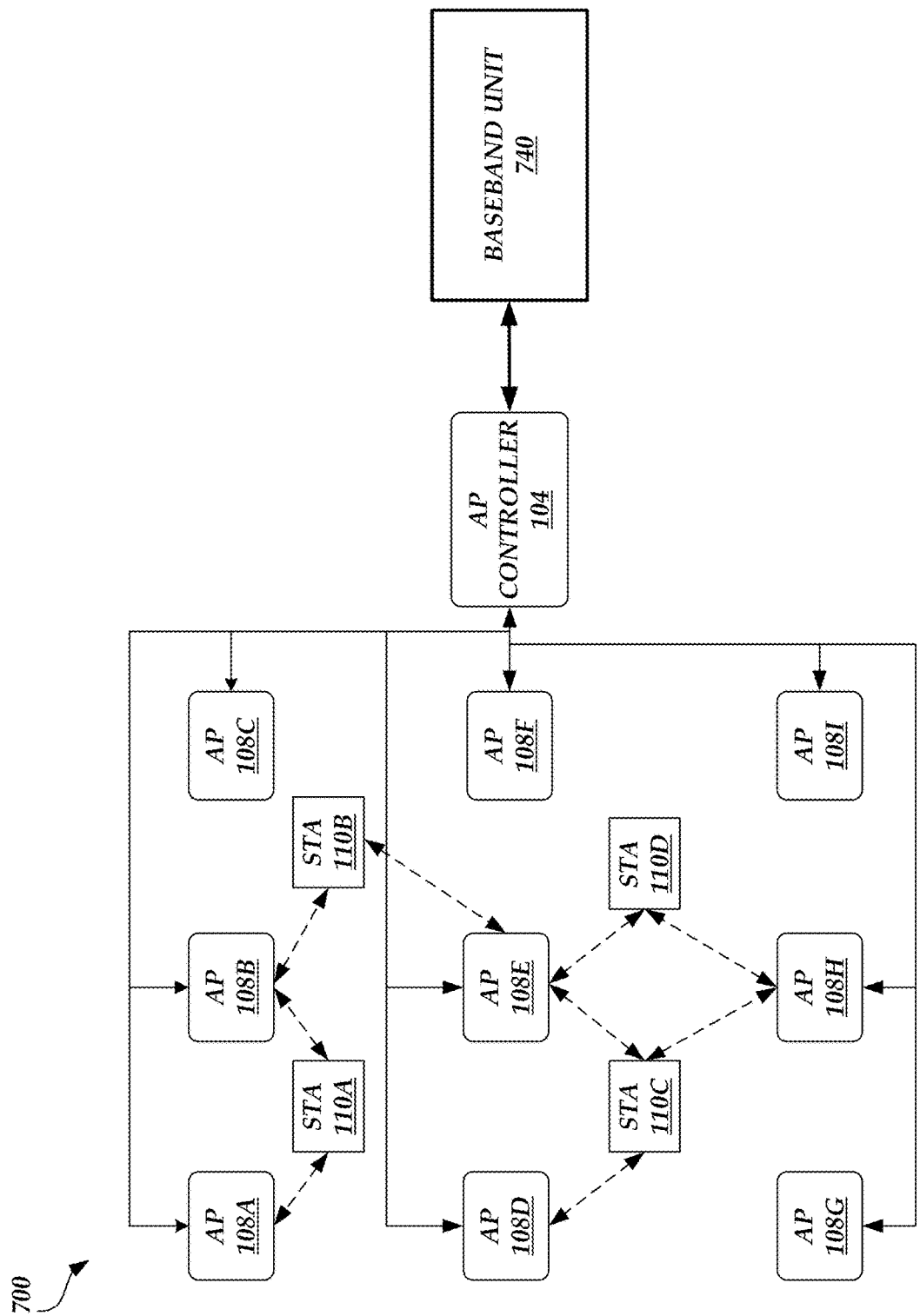
FIG. 7 is a diagram of an example multipoint environment in which multiple stations and access points can wirelessly communicate with each other in accordance with embodiments disclosed herein

FIG. 7 is a diagram of an example multipoint environment 700 in which multiple STAs 110A to 110D and APs 108A to 108I can communicate with each other in accordance with any suitable principles and advantages disclosed herein. The illustrated STAs and APs are examples of devices that can perform any suitable training and/or data selection disclosed herein. The STAs are example wireless terminals. The APs are example network nodes. The APs can be referred to as serving nodes. As illustrated in FIG. 7, the multipoint environment 700 includes a plurality of APs 108A to 108I, a plurality of STAs 110A to 110D, an AP controller 104, and a baseband unit 740. In an embodiment, data packets can be wirelessly transmitted from the baseband unit 740 to the plurality of STAs 110A to 110D via one or more of the APs 108A to 108I. Similarly, data packets can be transmitted from the plurality of STAs 110A to 110D to one or more APs 108A to 108I.

A STA 110A to 110D can communicate with multiple APs 108A to 108I and an AP 108A to 108I can communicate with multiple STAs 110A to 110D in a single wireless stack (e.g., a single IEEE 802.11 protocol stack). For example, a STA 110A to 110D can authenticate concurrently with multiple APs 108A to 108I and decode any data packet that includes a destination address that matches an address of the STA 110A to 110D in a header and/or preamble, irrespective of the source address included in the header or preamble of the data packet. Similarly, an AP 108A to 108I can decode any data packet that includes a destination address that matches an address of the AP 108A to 108I or that matches a wildcard address associated with the AP 108A to 108I in a header or preamble, irrespective of the source address included in the header of the data packet. For example, a wildcard address may be an address associated with multiple APs 108A to 108I rather than a unique address associated with just one AP 108A to 108I.

For the purposes of illustration and not meant to be limiting, STA 110A communicates with APs 108A and 108B, STA 110B communicates with APs 108B and 108E, STA 110C communicates with APs 108D, 108E, and 108H, and STA 110D communicates with APs 108E and 108H. The STAs 110A to 110D and APs 108A to 108I, however, can communicate with other APs 108A to 108I and/or STAs 110A to 110D. Thus, unlike wireless network environments in which a basic service set (BSS) includes one AP assigned to one or more STAs, the multipoint environment 700 has no pre-defined AP 108A to 108I to which a STA 110A to 110D is associated. Rather, the AP 108A to 108I transmitting a data packet to a particular STA 110A to 110D can change on a packet-by-packet basis. For example, the AP 108D can transmit a first data packet to the STA 110C at a first time, the AP 108E can transmit a second data packet to the STA 110C at a second time, the AP 108H can transmit a third data packet to the STA 110C at a third time, the AP 108D can transmit a fourth data packet to the STA 110C at a fourth time, and so on. In fact, the AP 108A to 108I that transmits a data packet to the STA 110A to 110D can change without the STA 110A to 110D changing BSSs to which the STA 110A to 110D is associated—the STA 110A to 110D may remain in the same BSS using the same, single wireless stack while the AP 108A to 108I that transmits data packets to the STA 110A to 110D changes. Similarly, there may be no pre-defined STA 110A to 110D to which an AP 108A to 108I is associated. Rather, the STA 110A to 110D transmitting a data packet to a particular AP 108A to 108I can change on a packet-by-packet basis.

The AP controller 104 can be configured to select the AP 108A to 108I to transmit a data packet to a STA 110A to 110D. For example, the AP controller 104 can route traffic to one or more APs 108A to 108I for transmission to one or more STAs 110A to 110D based on downlink and/or uplink channel quality measurements. The AP controller 104 can be in communication with one or more application servers. A downlink (DL) transmission generally refers to a communication from a network system (e.g., an AP) to a user terminal (e.g., a STA). An uplink (UL) transmission generally refers to a communication from the user terminal to the network system.

The APs 108A to 108I may each have one or more transmit antennas that each support one or more digital basebands. In some embodiments, each AP 108A to 108I has the same number of transmit antennas. In other embodiments, some or all APs 108A to 108I have a different number of transmit antennas than other APs 108A to 108I. Thus, the APs 108A to 108I may collectively be capable of transmitting N spatial beams, where N is the product of the number of APs 108A to 108I in the multipoint environment 700 and the number of transmit antennas operated by a single AP 108A to 108I. Similarly, each AP 108A to 108I can have the same number or different number of receive antennas. The baseband unit 740, the AP controller 104, and/or the APs 108A to 108I can be collectively referred to herein as a "network system."

Various standards and protocols may be included in the multipoint environment 700 to wirelessly communicate data between a network node (e.g., an AP 108) and a wireless communication device (e.g., a STA 110). Some wireless devices may communicate using an IEEE 802.11 standard, which may be known as Wi-Fi. As an example, the IEEE 802.11 standard can be an 802.11ad standard. While the multipoint environment 700 may be described with terminology that can be associated with Wi-Fi, any suitable principles and advantages associated with the multipoint environment 700 can be applied to communications with any suitable communication standards and/or protocols, such as third generation partnership project (3GPP) New Radio (NR).

The wireless communication device may be referred to as a station (STA) (e.g., for wireless communication devices that communicate using the IEEE 802.11 standard). The wireless communication device may also be referred to as a UE (e.g., for wireless communication devices that communicate in a RAN). The wireless communication device may be a device used by a user such as cellular telephone, a smartphone, a laptop, an extended reality terminal, a wireless device integrated with a head mounted display, a tablet computer, a wearable computing device such as smart glasses or a smart watch or an ear piece, one or more networked appliances (e.g., consumer networked appliances or industrial plant equipment), an industrial robot with connectivity, or a vehicle. In some implementations, the STA may include a sensor or other networked device configured to collect data and wirelessly provide the data to a device (e.g., server) connected to a core network such as the Internet. Such devices may be referred to as Internet of Things devices (IoT devices). In some instances, a wireless communication device can be a network node.

The AP controller 104 can function as a router to route traffic between the baseband unit 740 and the APs 108A to 108I. The AP controller 104 can implement a relatively small amount of buffering. This can contribute to the AP controller 104 routing data between the baseband unit 740 and the APs 108A to 108I with low latency.

The APs 108A to 108I can be arranged as an array. All of the APs 108A to 108I can be connected to the AP controller 104. The APs 108A to 108I can be connected to the AP controller 104 via wired or wireless connections. Each AP 108A to 108I can buffer a relatively low amount of frames of data at a time. For example, an AP 108A can buffer 1 or 2 frames of data at a time in certain applications. The frames can be relatively big frames. For example, one frame can include 100 to 150 Internet protocol (IP) packets. The APs 108A to 108I are arranged to wirelessly communicate with STAs 110A to 110D. The APs 108A to 108I can communicate via any suitable wireless links, such as wireless local area network (WLAN) links. WLAN signals can have a shorter signal range than cellular signals. In some instances, the WLAN signals can have a range of about 300 feet or less. WLAN signals can have a range of about 150 feet or less in certain applications. An example of a WLAN link is a Wi-Fi link. The WLAN link can be implemented based on an IEEE 802.11 standard, such as an IEEE 802.11ad standard. The APs 108A to 108I are networking hardware devices that include any suitable physical hardware to implement the functionalities disclosed herein. Although APs are described with reference to certain embodiments for illustrative purposes, any suitable principles and advantages described with references to access points can be implemented with any other suitable serving nodes of a network system. In some instances, there can be one or more wireless hops between network nodes. Any suitable wireless link that meets latency and throughput specifications can be used. Wi-Fi links, millimeter wave (mmW) wireless area network (WAN) links, and fifth generation (5G) New Radio (NR) links in Frequency Range 2 (FR2) are examples of such suitable wireless links.

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially. Any suitable combination of parallel and/or sequential execution of a method disclosed herein can be performed.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items.

Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A wireless communication device comprising:
at least one antenna; and
a processor in communication with the at least one antenna, wherein the processor is configured to cause the wireless communication device to:
wirelessly transmit a quasi-omni beam to a network node in a training mode such that the quasi-omni beam is time division multiplexed with a second quasi-omni beam received by the network node from another wireless communication device in a time slot for the training mode;
select a directional receive beam based on a third quasi-omni beam wirelessly transmitted by the network node during another training mode, wherein the wireless communication device is arranged to receive directional beams while the network node wirelessly transmits the third quasi-omni beam;
determine to wirelessly transmit a directional beam during a data transmission mode based on stored information identifying the directional receive beam to invoke reciprocity, wherein the directional beam corresponds to the directional receive beam; and
wirelessly transmit the directional beam to the network node in the data transmission mode, wherein the quasi-omni beam and the directional beam are each associated with a radio frequency signal having a frequency of at least 20 gigahertz.

2. The wireless communication device of claim 1, wherein the processor is further configured to:
select another directional receive beam based on the quasi-omni beam wirelessly transmitted by the network node in the training mode; and
configure the wireless communication device to receive a data transmission from the network node over the another directional receive beam.

3. The wireless communication device of claim 1, wherein the information identifying the directional receive beam is stored in a look-up table.

4. The wireless communication device of claim 1, wherein the directional beam is associated with a wireless communication in compliance with an 802.11 standard.

5. The wireless communication device of claim 1, wherein the directional beam is associated with cellular communication.

6. A method of wireless communication, the method comprising:
receiving, by a wireless communication device during a time slot for a training mode for the wireless communication device, a quasi-omni beam wirelessly transmitted by a network node and a second quasi-omni beam wirelessly transmitted by a second network node, wherein the quasi-omni beam and the second quasi-omni beam are time division multiplexed during the time slot for the training mode for the wireless communication device, wherein the wireless communication device and the network node wirelessly communicate with a radio frequency signal having a frequency of at least 20 gigahertz;
selecting a directional receive beam for the wireless communication device based on the quasi-omni beam wirelessly transmitted by the network node;
selecting a second directional receive beam for the wireless communication device based on the second quasi-omni beam wirelessly transmitted by the second network node;
receiving, by the wireless communication device, data from the network node over the selected directional receive beam and data from the second network node over the selected second directional receive beam during a data transmission mode following the time slot for the training mode for the wireless communication device; and
transmitting data over a directional transmit beam to the network node based on stored information identifying the directional received beam to invoke reciprocity.

7. The method of claim 6, wherein the radio frequency signal in compliance with an 802.11 standard.

8. The method of claim 6, wherein the radio frequency signal is an 802.11ad signal.

9. The method of claim 6, wherein the radio frequency signal is cellular signal.

10. The method of claim 6, wherein the radio frequency signal has a frequency within Frequency Range 2 for New Radio.

11. The method of claim 6, further comprising:
while the wireless communication device is configured to receive the quasi-omni beam, receiving an indication from the network node identifying that a data transmission is coming from the network node; and
in response to said receiving the indication, configuring the wireless communication device to receive from the network node over the directional receive beam.

12. The method of claim 11, wherein the indication from the network node comprises an identifier included in at least one of a Request to Send (RTS) or a Clear to Send (CTS).

13. The method of claim 6, further comprising initiating a training session that comprises said selecting based on a request from the network node to start the training session, wherein the request from the network node indicates that the wireless communication device will receive a data transmission from the network node after the training session.

14. A method of wireless communication, the method comprising:
receiving, by a first node, a first quasi-omni beam wirelessly transmitted by a second node in a training mode and a second quasi-omni beam wirelessly transmitted by a third node in a time slot for the training mode, wherein the second node and the third node time division multiplex the first quasi-omni beam and the second quasi-omni beam, wherein the first node and the second node wirelessly communicate with a radio frequency signal having a frequency of at least 20 gigahertz;
configuring the first node to receive a first directional receive beam from the second node and a second directional receive beam from the third node, wherein the first directional receive beam is selected based on the first quasi-omni beam wirelessly transmitted by the second node in the time slot for the training mode, and wherein the second directional receive beam is selected based on the second quasi-omni beam wirelessly transmitted by the third node in the time slot for the training mode;
receiving, by the first node, data from the second node over the first directional receive beam in a data transmission mode and data from the third node over the second directional receive beam in the data transmission mode; and
transmitting, by the first node, data over a directional transmit beam to the second node based on stored information identifying the first directional receive beam to invoke reciprocity.

15. The method of claim 14, wherein the first node receives the first quasi-omni beam transmitted by the second node and the second quasi-omni beam transmitted by the third node in back-to-back slots in the training mode.

16. The method of claim 6, wherein the wireless communication device, the network node, and the second network node are in a multipoint environment while the method is performed, and wherein multiple network nodes and multiple wireless communication devices wirelessly communicate with each other in the multipoint environment.

17. The wireless communication device of claim 1, wherein the processor is configured to process a plurality of quasi-omni beams received during a time slot for the another training mode, the plurality of quasi-omni beams are time division multiplexed with each other, and the plurality of quasi-omni beams including the third quasi-omni beam.

18. The method of claim 6, further comprising transmitting a third quasi-omni beam to the network mode such that the third quasi-omni beam is time division multiplexed with a fourth quasi-omni beam transmitted from a second wireless communication device during a time slot for a training mode for the network node.

* * * * *